(12) United States Patent
Iang

(10) Patent No.: US 8,480,905 B2
(45) Date of Patent: Jul. 9, 2013

(54) METHOD AND SYSTEM FOR RECYCLING AND TREATING DYEING WASTEWATER

(76) Inventor: Jr-Jung Iang, Changhua (TW)

( * ) Notice: Subject to any disclaimer, the term of this patent is extended or adjusted under 35 U.S.C. 154(b) by 312 days.

(21) Appl. No.: 13/040,193

(22) Filed: Mar. 3, 2011

(65) Prior Publication Data

US 2012/0223018 A1   Sep. 6, 2012

(51) Int. Cl.
*B01D 61/00* (2006.01)
*B01D 63/00* (2006.01)
*B01D 15/00* (2006.01)

(52) U.S. Cl.
USPC ........ 210/652; 210/663; 210/640; 210/195.1; 210/257.2

(58) Field of Classification Search
USPC .............. 210/650, 652, 663, 640, 767, 195.1, 210/257.2
See application file for complete search history.

(56) References Cited

U.S. PATENT DOCUMENTS

| | | | |
|---|---|---|---|
| 3,947,248 A * | 3/1976 | Powers .............................. | 8/440 |
| 3,969,239 A * | 7/1976 | Shinohara et al. ............ | 210/735 |
| 4,005,011 A * | 1/1977 | Sweeny ......................... | 210/631 |
| 4,720,345 A * | 1/1988 | Linder et al. ................... | 210/650 |
| 4,758,347 A * | 7/1988 | Henz et al. ..................... | 210/639 |
| 5,310,486 A * | 5/1994 | Green et al. ................... | 210/638 |
| 5,366,551 A * | 11/1994 | Aidun ............................ | 118/411 |
| 5,520,816 A * | 5/1996 | Kuepper ........................ | 210/649 |
| 5,587,083 A * | 12/1996 | Twardowski .................. | 210/652 |
| 6,036,864 A * | 3/2000 | Demyanovich ............... | 210/651 |
| 6,428,705 B1 * | 8/2002 | Allen et al. .................... | 210/638 |
| 2009/0101583 A1* | 4/2009 | Perry ............................. | 210/664 |
| 2012/0223018 A1* | 9/2012 | Iang ............................... | 210/652 |
| 2012/0285887 A1* | 11/2012 | Zhang ............................ | 210/636 |

* cited by examiner

*Primary Examiner* — Ana Fortuna

(57) ABSTRACT

A method and system for recycling and treating dyeing wastewater are provided. To begin with, the dyeing wastewater is added with an adsorbent for assisted decolorization and filtration. Then, the wastewater is filtered with a first filtration device having hydrophilic membranes. The liquid having passed through the hydrophilic membranes undergoes an RO membrane-base filtration process to produce recycled water and concentrated wastewater. The concentrated wastewater is delivered into a second filtration device having hydrophobic membranes, before a micro-bubbling process is performed on the concentrated wastewater in the second filtration device to turn the concentrated wastewater into a creamy-white nebulized working liquid of high gas content. The steam in the working liquid can readily pass through the hydrophobic membranes to produce an effluent that meets effluent standards.

10 Claims, 6 Drawing Sheets

METHOD AND SYSTEM FOR RECYCLING AND TREATING DYEING WASTEWATER

BACKGROUND OF THE INVENTION

1. Field of the Invention

The present invention relates to wastewater treatment methods and systems, and more particularly, to a method and system for recycling and treating dyeing wastewater efficiently and at low costs, wherein the method and system are effective in solving problems found with effluent chromaticity.

2. Description of the Related Art

As the dyeing industry requires the use of various dyes, surfactants, and chemical agents, dyeing wastewater is characterized by high chromaticity, marked variation in water quality, and low biodegradability. Therefore, dyeing wastewater has to be treated by both biological and chemical processes in order to reduce biochemical oxygen demand (BOD), chemical oxygen demand (COD), suspended solids (SS), and chromaticity of the dyeing wastewater.

A conventional method employed by most dyeing factories in Taiwan to treat dyeing wastewater essentially comprises, as shown in FIG. 1, the steps of: roughly screening the collected dyeing wastewater; delivering the roughly screened dyeing wastewater to a regulating tank for pH adjustment; performing a biological process (activated sludge and biological sedimentation) on the pH-adjusted dyeing wastewater, followed by delivering the processed dyeing wastewater to a sedimentation tank; performing a chemical process in conjunction with chlorination-induced decolorization on the dyeing wastewater to produce an effluent; and discharging the effluent. Hence, the conventional method for treating dyeing wastewater essentially includes activated sludge and chemical coagulation. These two treatment processes, however, end up with a large amount of sludge whose water content is so high that the sludge can only be dehydrated by distillation. As a result, the conventional method for treating dyeing wastewater is energy-intensive and cost-incurring. Besides, the chromaticity of the processed effluent is too high to meet the existing effluent chromaticity standard recommended by the American Dye Manufacturers Institute (ADMI). Therefore, dyeing wastewater decolorization technology has become an environmental protection issue that draws attention from the dyeing industry.

Reverse osmosis (RO), one of the several membrane filtration techniques in use, is regarded by the dyeing industry as one of the best methods for treating recycled water in terms of the resultant water quality. RO uses reverse osmosis membranes (RO membranes) to remove organic matters from water and reduce chromaticity thereof. With RO, the removal rate of COD and chromaticity is at least 90%. However, as dyeing wastewater contains a large amount of suspended substances, if the dyeing wastewater does not undergo a proper pre-treatment process, the RO membranes are subject to concentration polarization and may produce oxidized crystals. Even worse, the efficiency of filtration may dwindle to an incapacitated level because of a cake layer formed on the membrane surface or because of plugged membrane pores. Hence, RO requires expensive apparatuses and incurs high operation costs. More importantly, the concentrated wastewater resulting from RO cannot be treated again by RO membranes for solid-liquid separation; the dyeing industry can only perform multi-stage distillation dehydration on the concentrated wastewater so as for the ions therein to crystallize. The latter process, however, is energy-intensive and time-consuming and thus poses a thorny problem.

Known methods for treating dyeing wastewater also include a Fenton process that employs titanium dioxide ($TiO_2$) and a process that involves using an electric field or a crystallization technique to boost treatment efficacy and reduce the yield of chemical sludge. Nonetheless, the aforesaid processes are focused on the removal of dyeing chromaticity from wastewater but do not offer an efficient and cost-saving solution to treating the resultant concentrated wastewater (or sludge). In consequence, the dyeing industry is confronted with increasingly high costs for environmental protection and improvement. Accordingly, it is imperative for the related industries to employ both clean production technology and contamination control technology, so as to strike a balance between economy and environmental protection, cut production costs, and enhance competitiveness.

BRIEF SUMMARY OF THE INVENTION

It is an objective of the present invention to provide a method and system for recycling and treating dyeing wastewater efficiently and at low costs, wherein the method and system not only solve problems with effluent chromaticity effectively but also provide secondary treatment to concentrated wastewater.

A method for recycling and treating dyeing wastewater according to the present invention comprises the following steps:

Step (A): Dyeing wastewater is drawn into a pre-treatment tank.

Step (B): An adsorbent is introduced into the pre-treatment tank, such that the adsorbent and the dyeing wastewater mix quickly to assist in decolorization and filtration of the dyeing wastewater. The pre-treatment tank has therein a first filtration device. The first filtration device comprises at least one hydrophilic porous membrane.

Step (C): The wastewater having undergone the assisted decolorization is passed through the first filtration device for filtration treatment, with a view to reducing the chromaticity and suspended solid content of the wastewater.

Step (D): The liquid resulting from the filtration treatment of the first filtration device is delivered into an RO filtration unit so as to perform an RO membrane-based filtration process on the liquid. The clean water having permeated through the RO membranes of the RO filtration unit is collected and delivered into a recycling tank for reuse.

Step (E): The concentrated wastewater discharged from the RO filtration unit is guided into a second filtration device, wherein the second filtration device comprises at least one hydrophobic porous membrane.

Step (F): A micro-bubbling and mixing process is performed on the concentrated wastewater in the second filtration device, such that the concentrated wastewater is mixed evenly with a gas to form a creamy-white nebulized working liquid.

Step (G): A suction-oriented negative pressure is applied to the water yielding sides of the hydrophobic membranes, so as for the steam in the working liquid, which is of high gas content, to readily pass through the hydrophobic membranes. Thus, the residual chromaticity and suspended particles are removed from the working liquid, and an effluent that meets effluent standards is produced.

A system for recycling and treating dyeing wastewater as proposed by the present invention comprises a pre-treatment tank, a first filtration device, an RO filtration unit, a recycling tank, a second filtration device, a micro-bubbling device, and a recycling tank. The pre-treatment tank is configured for containing a predetermined volume of dyeing wastewater.

The first filtration device is disposed in the pre-treatment tank and comprises a horizontally positioned central pipe and a plurality of hydrophilic porous membranes mounted around the central pipe in a watertight manner. Each of the hydrophilic membranes is in communication with the central pipe so that a liquid having permeated through the hydrophilic membranes can flow into the central pipe. The RO filtration unit is connected to an effluent end of the central pipe of the first filtration device. The recycling tank is disposed beside the RO filtration unit and is configured to collect and recycle for reuse the clean liquid having passed through the RO filtration unit. The second filtration device is connected to a concentrated wastewater discharging pipeline of the RO filtration unit. The second filtration device comprises a casing for receiving concentrated wastewater, a water yielding pipe centrally and vertically disposed in the casing, and a plurality of horizontally arranged hydrophobic porous membranes equally spaced from each other. The micro-bubbling device is disposed beside the second filtration device and comprises a gas supply corresponding in position to the casing so as to pump a pressurized gas into the concentrated wastewater in the casing and thereby turn the concentrated wastewater into a creamy-white nebulized working liquid. The recycling tank is connected to an effluent outlet of the water yielding pipe of the second filtration device.

In order to minimize clogging and fouling of the RO membranes, the present invention entails using an adsorbent to assist in dehydration and filtration of dyeing wastewater and performing a hydrophilic membrane-based pre-treatment filtration process on the dyeing wastewater before the RO membrane-based filtration process is conducted. Moreover, a micro-bubbling process is performed on the concentrated wastewater discharged during the RO membrane-based filtration process, and a solid-liquid separation process is subsequently performed by means of hydrophobic membranes so as for the chromaticity, BOD, and COD of the resultant effluent to meet existing effluent standards. The use of hydrophobic membranes and the revolution thereof not only extend membrane operation lifecycle effectively, but also enable quick and efficient operation, reduce the required amount of additives, and lower operation costs.

DETAILED DESCRIPTION OF THE EMBODIMENTS OF THE INVENTION

Figure 1:
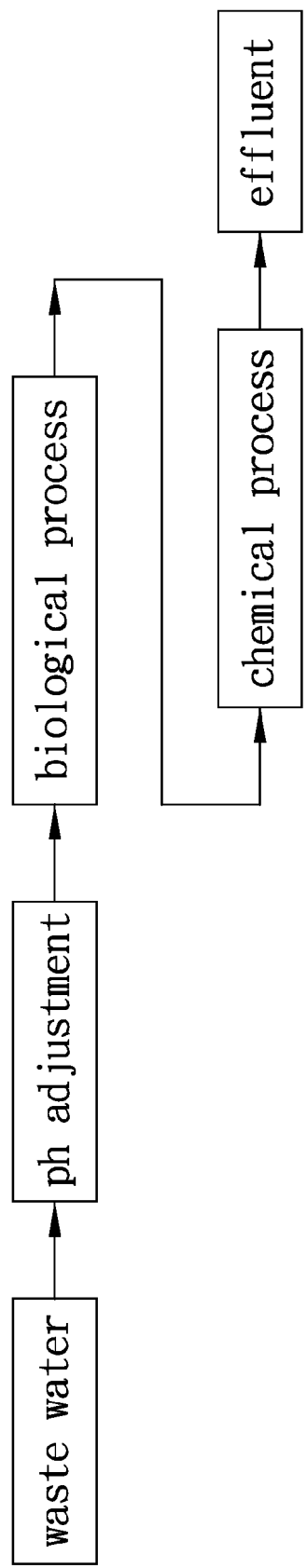
FIG. 1 is a block-diagram flowchart of a conventional dyeing wastewater treatment process.
Figure 2:
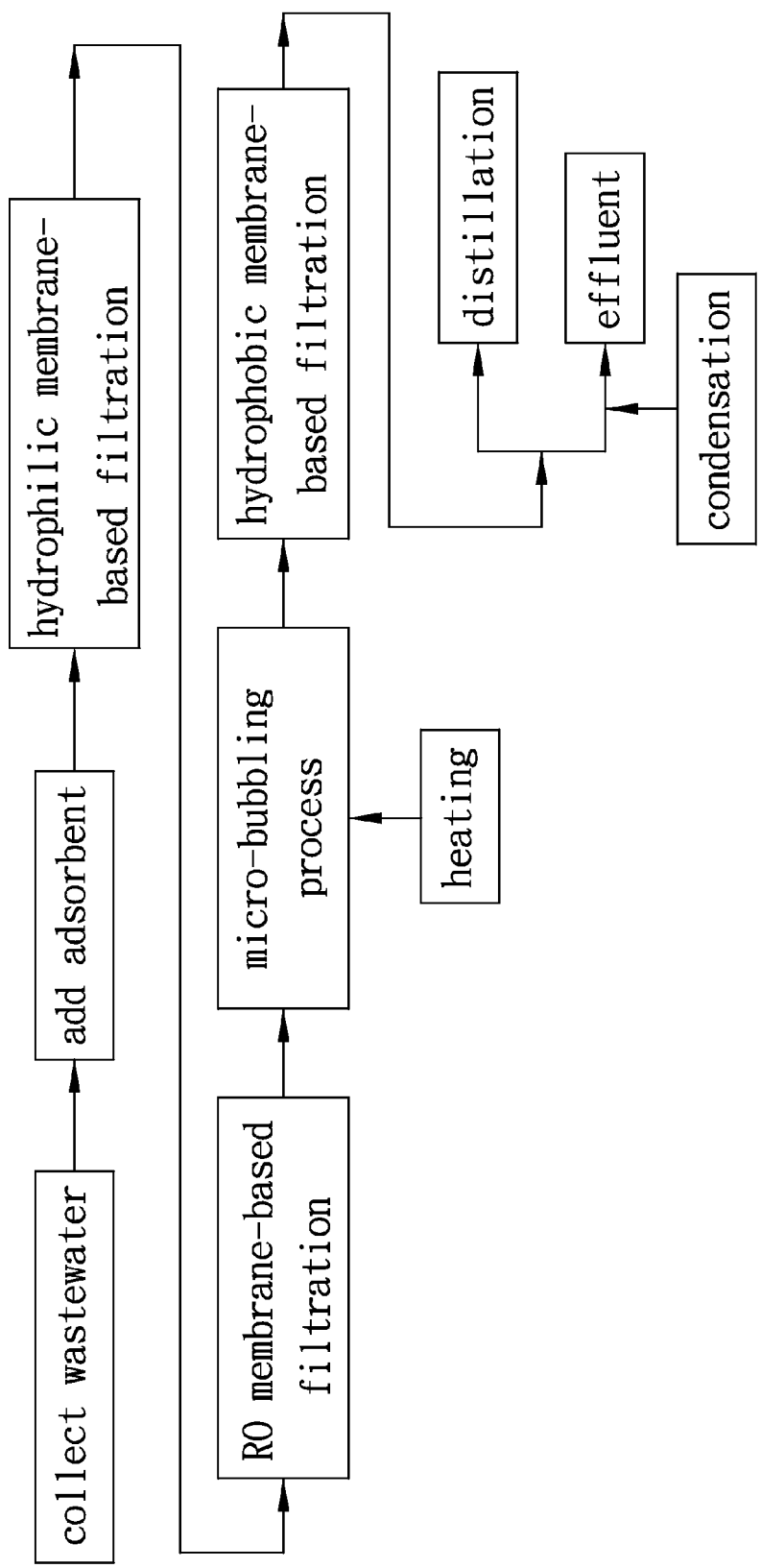
FIG. 2 is a block-diagram flowchart of a method for recycling and treating dyeing wastewater according to a preferred embodiment of the present invention.
Figure 3:
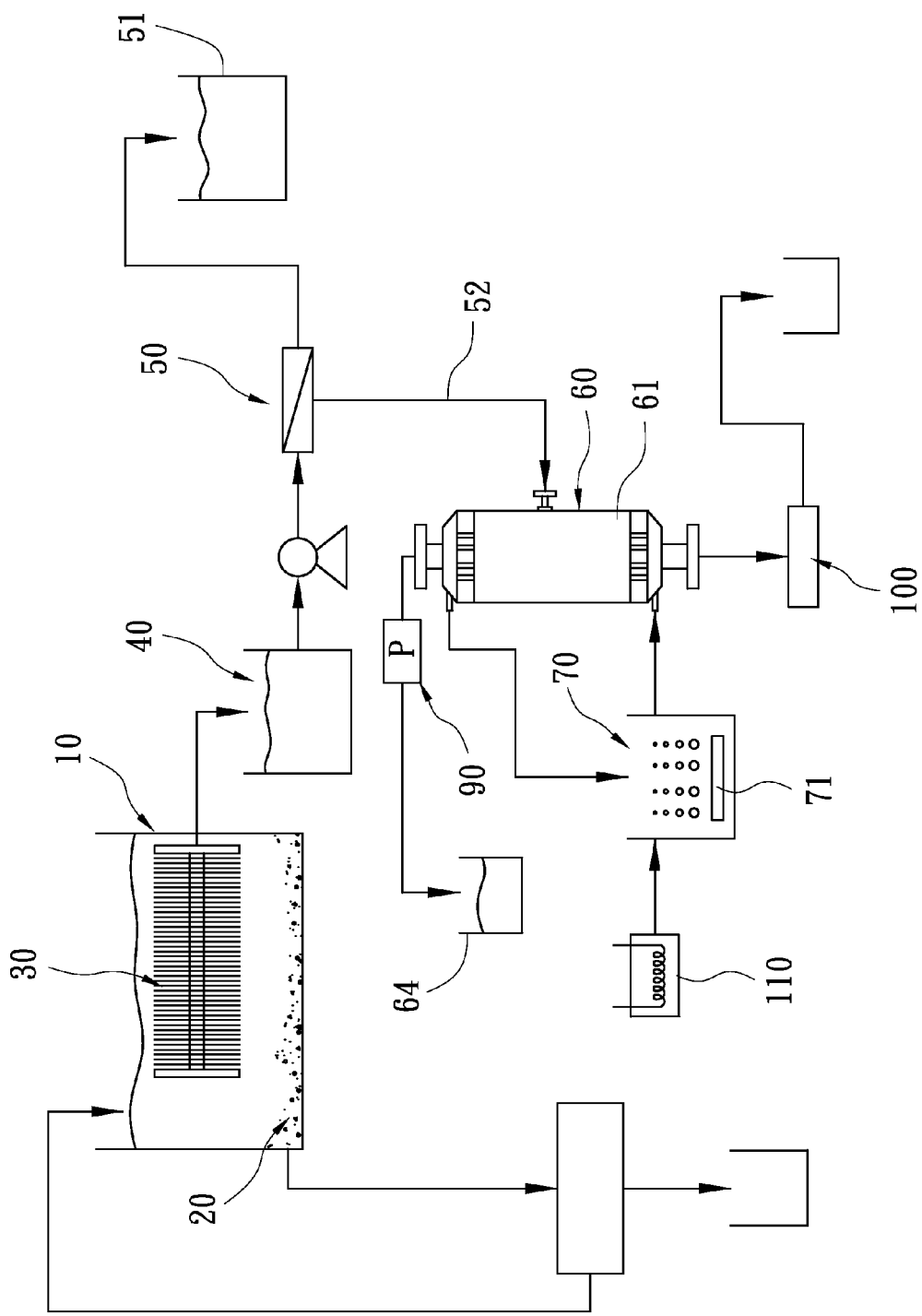
FIG. 3 is a schematic framework diagram of a system for recycling and treating dyeing wastewater according to a preferred embodiment of the present invention, showing in particular the constituent devices and pipeline layout of the system.

Please refer to FIG. 2 and FIG. 3 for a method and system for recycling and treating dyeing wastewater according to a first embodiment of the present invention. As shown in FIG. 2, the method comprises the following steps:

Step (A): Dyeing wastewater is collected and guided into a pre-treatment tank 10 for subsequent treatment.

Figure 4:
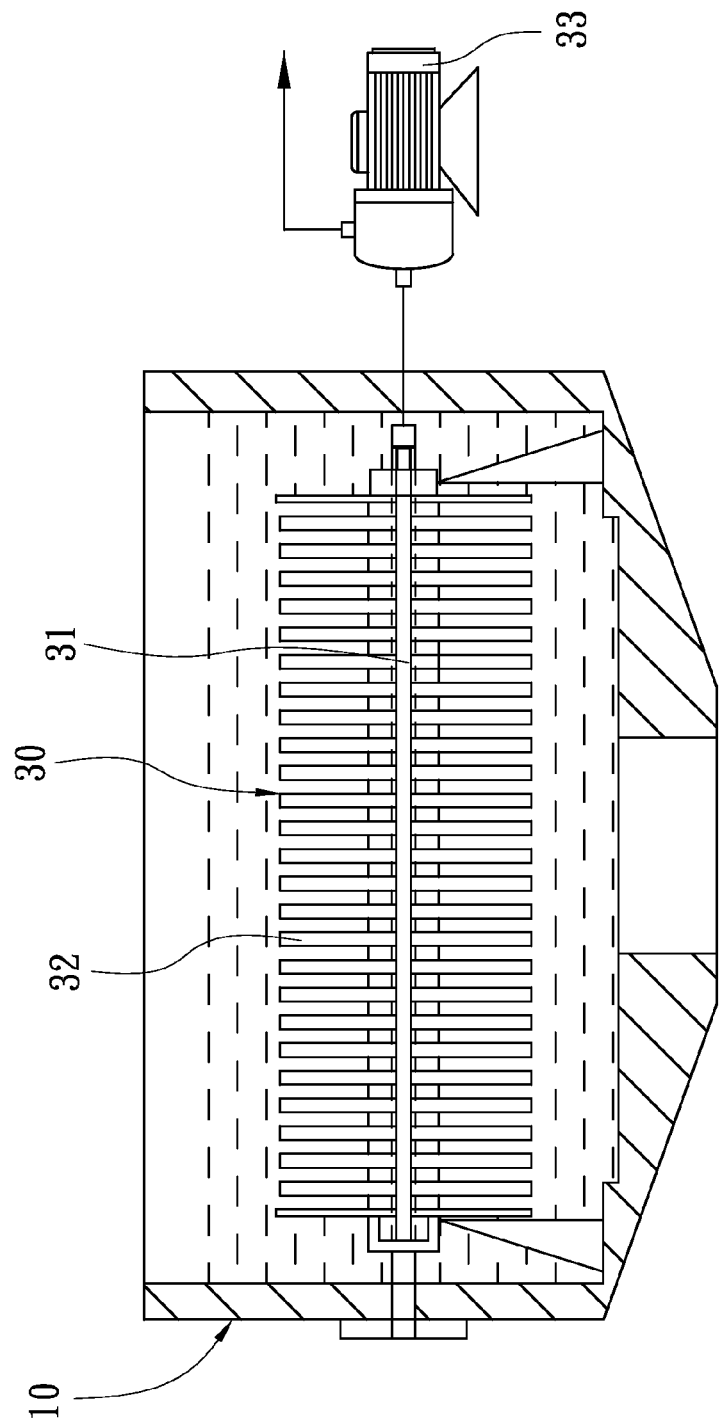
FIG. 4 is a cross-sectional view of a first filtration device of the present invention.

Step (B): An appropriate amount of adsorbent 20 is added into the pre-treatment tank 10, wherein the adsorbent 20 is one of diatomite, activated carbon, and zeolite powder. The adsorbent 20 is quickly mixed with the dyeing wastewater so as for the adsorbent 20 to adsorb the dyes and suspended particles in the dyeing wastewater and thereby assist in decolorization and filtration of the dyeing wastewater. The pre-treatment tank 10 is provided therein with a first filtration device 30. Referring to FIG. 4, the first filtration device 30 is transversely disposed and submerged in the pre-treatment tank 10. The first filtration device 30 comprises a horizontally positioned central pipe 31 and a plurality of hydrophilic porous membranes 32 (exemplified herein by ultrafiltration (UF) membranes) mounted around the central pipe 31 in a watertight manner. Each of the hydrophilic membranes 32 is in communication with the central pipe 31 so that a liquid having permeated through the hydrophilic membranes 32 can flow into the central pipe 31.

Step (C): Driven by an external pressurizing pump 33, the wastewater having undergone the assisted decolorization is passed through the hydrophilic membranes 32 of the first filtration device 30 for filtration treatment, thereby reducing the chromaticity and suspended solid content of the liquid. In this step, the liquid which has permeated through the hydrophilic membranes 32 is delivered into a collecting tank 40 via the central pipe 31 for subsequent treatment. Also, the sludge resulting from the assisted decolorization and filtration is discharged from the pre-treatment tank 10 and then treated by a sludge concentration and dehydration process. Afterward, the concentrated and dehydrated sludge can be directly discharged to the outside for burial, and the water resulting from the dehydration process is pumped back into the pre-treatment tank 10, thereby subjecting the wastewater to cyclic treatment.

Step (D): The liquid which has been pumped into the collecting tank 40 and rid of a major portion of the dyes is delivered into an RO filtration unit 50 so as to perform an RO membrane-based filtration process on the liquid. Meanwhile, the clean liquid which has permeated through the water yielding ends of the RO membranes of the RO filtration unit 50 is delivered to a recycling tank 51 for recycling and reuse.

Figure 5:
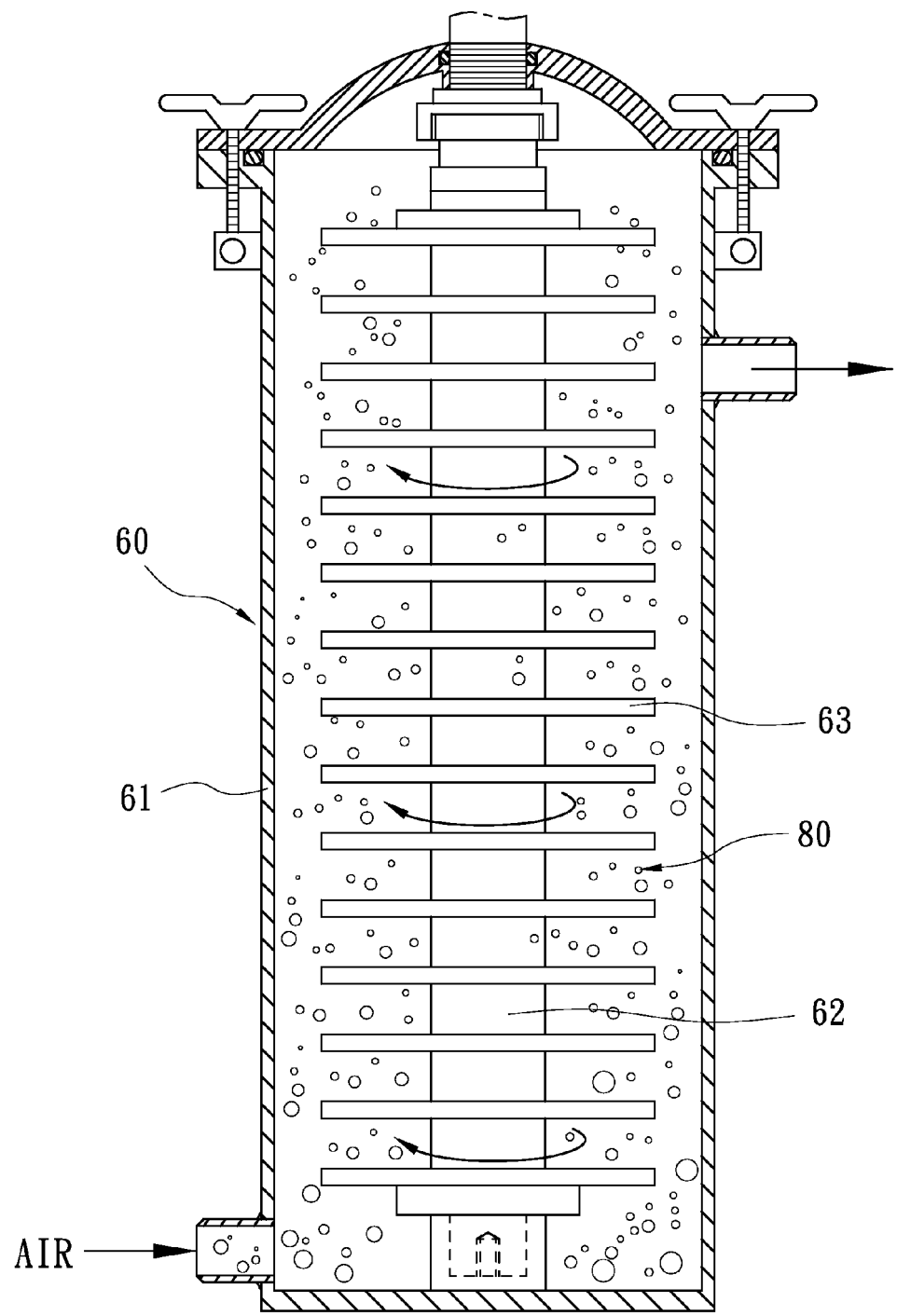
FIG. 5 is a cross-sectional view of a second filtration device of the present invention.

Step (E): The concentrated wastewater discharged from the RO filtration unit 50 is added with a decolorant and then guided into a second filtration device 60. In this embodiment, the decolorant added to the concentrated wastewater is NaOCl and is intended to eliminate the residual chromaticity in the concentrated wastewater. The second filtration device 60 is connected to a concentrated wastewater discharging pipeline 52 of the RO filtration unit 50. Referring to FIG. 5, the second filtration device 60 comprises a cylindrical casing 61 for receiving the concentrated wastewater, a water yielding pipe 62 centrally and vertically disposed in the casing 61, and a plurality of hydrophobic porous membranes 63 which are equally spaced from each other and horizontally arranged. Each of the hydrophobic membranes 63 comprises two layers of membrane material hermetically sealed together at the edges thereof, has a pouch-shaped structure, and is horizontally disposed in the casing 61. The water yielding side (i.e., inner side) of each hydrophobic membrane 63 is in communication with the water yielding pipe 62.

Step (F): A gas is injected by a micro-bubbling device 70 into the second filtration device 60, so as to perform a micro-bubbling and mixing process on the concentrated wastewater in the casing 61. The micro-bubbling device 70 comprises a gas supply 71 (e.g., a bubble generator) corresponding in position to the casing 61 and is configured to blow a pressurized gas into the concentrated wastewater in the casing 61, such that the concentrated wastewater and the gas mix evenly to form a creamy-white nebulized working liquid 80. The water molecules of the working liquid 80 are subjected to aeration to a great extent and hence further separated from each other, thereby increasing the amount of steam produced. In doing so, the concentrated wastewater which is initially in the liquid phase is turned into the working liquid 80 which has a gaseous-phase portion. Furthermore, an external decelerator (not shown) drives the water yielding pipe 62 of the second filtration device 60 to rotate while the gas supply 71 performs the aeration process. The rotation of the water yielding pipe 62 causes synchronous revolution of the hydrophobic membranes 63 mounted around the periphery of the water yielding pipe 62 and thus produces an enhanced stirring effect on the working liquid 80. Consequently, not only is the effect of mixing the concentrated wastewater with the gas enhanced, but also perturbation of the hydrophobic membranes 63 is effectuated to prevent fouling and clogging of the surfaces of the hydrophobic membranes 63 and thereby extend the membrane operation lifecycle.

Figure 6:
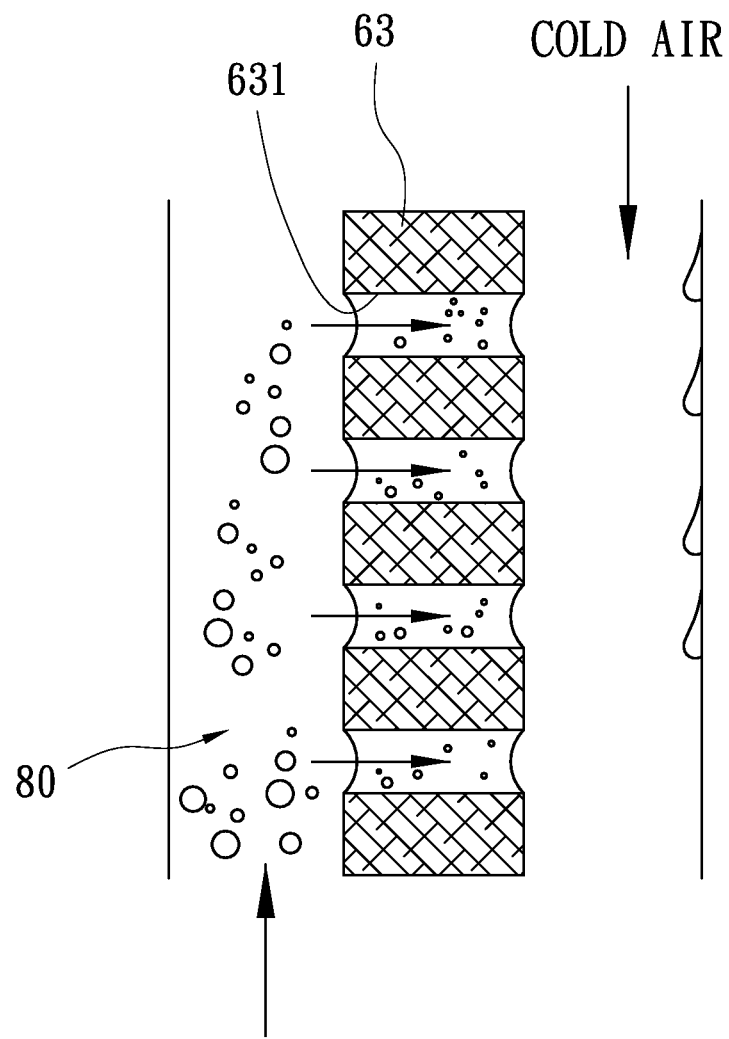
FIG. 6 is a schematic view of solid-liquid separation according to the present invention, illustrating how to perform a micro-bubbling process on concentrated wastewater so as to form a working liquid that releases a large amount of saturated steam, and how the steam passes through hydrophobic membranes to produce an effluent.

Step (G): A suction-oriented negative pressure is applied by a negative pressure element 90 (e.g., a vacuum pump) to the water yielding sides of the hydrophobic membranes 63. As the tiny pores 631 on the surfaces of the hydrophobic membranes 63 admit only steam molecules, the steam in the working liquid 80, which is of high gas content, can readily pass through the pores 631 of the hydrophobic membranes 63 as shown in FIG. 6, thus separating the water molecules of the working liquid 80 from the suspended solid particles. The steam that has passed through the hydrophobic membranes 63 undergoes condensation on the water yielding sides of the hydrophobic membranes 63 (e.g., by introducing cold air into the water yielding pipe 62) and turns into water. The water thus produced is sucked into the water yielding pipe 62 by the negative pressure element 90, such that an effluent which meets effluent standards is obtained. The effluent may be discharged directly from the water yielding pipe 62 or pumped into a container 64 for storage or subsequent use.

Step (H): If necessary, a distillation and dehydration process is performed by an evaporator 100 on the sludge that has produced the effluent. As the sludge in the casing 61 now has high solid particle content and low water content, it is feasible to shorten the duration of the distillation and dehydration process performed on the sludge. The dehydrated dry sludge can be directly buried.

In the method and system described above for recycling and treating dyeing wastewater according to the first embodiment of the present invention, the micro-bubbling and mixing process performed on the concentrated wastewater in step (F) further involves heating the pressurized gas at a high temperature by a pre-heating device 110 before the pressurized gas is pumped into the concentrated wastewater, so as for the working liquid 80 to have a specific temperature. In this embodiment, the heating temperature for the working liquid 80 preferably ranges between 30° C. and 60° C., not only to meet the temperature requirement of heat-resistant operation of the hydrophobic membranes 63, but also to speed up vaporization of a portion of water in the working liquid 80, thereby greatly increasing the yield of the effluent.

Compared with the conventional methods for treating dyeing wastewater, the method and system for recycling and treating dyeing wastewater according to the present invention have the following advantageous effects:

1. The likelihood of RO membrane clogging and fouling can be reduced because, prior to the RO membrane-based filtration process, the adsorbent 20 is used to assist in dehydration and filtration of the dyeing wastewater, followed by the pre-treatment filtration process performed by the hydrophilic membranes 32. Furthermore, the micro-bubbling process makes it possible for the concentrated wastewater to be dehydrated via the hydrophobic membranes 63, thereby enhancing the efficiency of recycling and treating the dyeing wastewater.

2. The otherwise untreatable RO-treated concentrated wastewater is made treatable by performing the micro-bubbling process to form the working liquid 80 which contains high-concentration saturated steam. The steam in the working liquid 80 can pass readily through the hydrophobic membranes 63 so that the water and solids in the concentrated wastewater are separated to effectuate advanced treatment, namely secondary decolorization and filtration, which ensures that the effluent meets effluent standards.

3. The micro-bubbling process and the synchronous revolution of the hydrophobic membranes 63 together prevent fouling of the hydrophobic membranes 63 inside the second filtration device 60. In addition, the gas injected into the concentrated wastewater stirs the working liquid vigorously to prevent clogging and concentration polarization of the membrane surfaces, thereby extending the service life of the membranes and reducing costs.

4. Since the water in the working liquid 80 is subjected to the dehydration effect of the second filtration device 60, the sludge discharged from the second filtration device 60 has low water content; as a result, the duration and costs of a subsequent distillation process can be minimized. Also, as the present invention only requires a small amount of decolorant to be added to the concentrated wastewater to remove the residual chromaticity, not only can the costs of additives be cut, but also the hazards caused by residual chlorine to the environment can be reduced.

While the present invention is disclosed herein by way of a preferred embodiment thereof, a person skilled in the art should understand that the preferred embodiment is intended only to illustrate the present invention and should not be interpreted as restrictive of the scope of the present invention. Hence, all simple equivalent variations and modifications made to the aforesaid embodiment should fall within the scope of the present invention.

What is claimed is:

1. A method for recycling and treating dyeing wastewater, comprising the steps of:
   step (A): drawing dyeing wastewater into a pre-treatment tank;
   step (B): introducing an adsorbent into the pre-treatment tank, such that the adsorbent mixes quickly with the dyeing wastewater to assist in decolorization and filtration of the dyeing wastewater, wherein the pre-treatment tank has therein a first filtration device, the first filtration device comprising at least a hydrophilic porous membrane;
   step (C): passing the wastewater having undergone the assisted decolorization through the first filtration device for filtration treatment, so as to reduce chromaticity and suspended solid content of the wastewater;

step (D): delivering a liquid resulting from the filtration treatment of the first filtration device to an RO filtration unit, followed by performing an RO membrane-based filtration process on the liquid and delivering clean water having permeated through an RO membrane of the RO filtration unit to a recycling tank for reuse;

step (E): delivering concentrated wastewater discharged from the RO filtration unit to a second filtration device, the second filtration device comprising at least a hydrophobic porous membrane;

step (F): performing a micro-bubbling and mixing process on the concentrated wastewater in the second filtration device, such that the concentrated wastewater and a gas mix evenly to form a creamy-white nebulized working liquid; and step (G): applying a suction-oriented negative pressure to a water yielding side of each said hydrophobic membrane, such that a steam in the working liquid, which is of high gas content, can readily pass through the at least a hydrophobic membrane, thereby removing residual chromaticity and suspended particles from the working liquid and producing an effluent that meets effluent standards.

2. The method of claim 1, wherein, in step (B), the adsorbent introduced into the pre-treatment tank is one of diatomite, activated carbon, and zeolite powder.

3. The method of claim 1, further comprising, before step (E), the step of adding a decolorant to the concentrated wastewater having undergone the RO membrane-based filtration process.

4. The method of claim 1, further comprising, after step (G), the step of performing a dehydration process on high-concentration sludge having produced the effluent.

5. The method of claim 1, wherein, in step (F), the gas pumped into the concentrated wastewater for performing the micro-bubbling and mixing process is heated at a high temperature beforehand, such that the working liquid has a specific temperature.

6. The method of claim 5, wherein the temperature at which the working liquid is heated ranges between 30° C. and 60° C.

7. The method of claim 5, further comprising, in step (G), the step of performing a condensation process on steam molecules having passed through the at least a hydrophobic membrane, so as for the steam to condense into the effluent.

8. A system for recycling and treating dyeing wastewater, comprising:

a pre-treatment tank for containing a predetermined volume of dyeing wastewater;

a first filtration device disposed in the pre-treatment tank, the first filtration device comprising a horizontally positioned central pipe and a plurality of hydrophilic porous membranes mounted around the central pipe in a water-tight manner, the hydrophilic membranes being in communication with the central pipe, such that a liquid having permeated through the hydrophilic membranes can flow into the central pipe;

an RO filtration unit connected to an effluent end of the central pipe of the first filtration device;

a recycling tank disposed beside the RO filtration unit and configured to collect and recycle for reuse a clean liquid having passed through the RO filtration unit;

a second filtration device connected to a concentrated wastewater discharging pipeline of the RO filtration unit, the second filtration device comprising a casing for receiving concentrated wastewater, a water yielding pipe centrally and vertically disposed in the casing, and a plurality of hydrophobic porous membranes which are equally spaced from each other and horizontally arranged;

a micro-bubbling device disposed beside the second filtration device, the micro-bubbling device comprising a gas supply corresponding in position to the casing so as to pump a pressurized gas into the concentrated wastewater in the casing and thereby turn the concentrated wastewater into a creamy-white nebulized working liquid; and a recycling tank connected to an effluent outlet of the water yielding pipe of the second filtration device.

9. The system of claim 8, further comprising a pre-heating device from which the working liquid acquires a specific temperature.

10. The system of claim 8, further comprising a negative pressure element configured to communicate with the water yielding pipe of the second filtration device and generate vacuum suction toward a water yielding side of each said hydrophobic membrane.

* * * * *